US011630266B2

(12) United States Patent
Aharon et al.

(10) Patent No.: US 11,630,266 B2
(45) Date of Patent: Apr. 18, 2023

(54) ADIABATIC OPTICAL SWITCH USING A WAVEGUIDE ON A MEMS CANTILEVER

(71) Applicants: MELLANOX TECHNOLOGIES, LTD., Yokneam (IL); YISSUM RESEARCH DEVELOPMENT COMPANY OF THE HEBREW UNIVERSITY LTD., Jerusalem (IL)

(72) Inventors: Eran Aharon, Tel Aviv (IL); Dan Mark Marom, Mevaseret Zion (IL); Dimitrios Kalavrouziotis, Papagou (GR); Paraskevas Bakopoulos, Ilion (GR); Elad Mentovich, Tel Aviv (IL)

(73) Assignees: YISSUM RESEARCH DEVELOPMENT COMPANY OF THE HEBREW UNIVERSITY LTD., Jerusalem (IL); MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/421,389

(22) PCT Filed: Jan. 17, 2019

(86) PCT No.: PCT/GR2019/000004
§ 371 (c)(1),
(2) Date: Jul. 8, 2021

(87) PCT Pub. No.: WO2020/148557
PCT Pub. Date: Jul. 23, 2020

(65) Prior Publication Data
US 2022/0091341 A1    Mar. 24, 2022

(51) Int. Cl.
*G02B 6/35*    (2006.01)

(52) U.S. Cl.
CPC ............ *G02B 6/3566* (2013.01); *G02B 6/355* (2013.01); *G02B 6/3508* (2013.01); *G02B 6/3546* (2013.01); *G02B 6/3584* (2013.01)

(58) Field of Classification Search
CPC .......................... G02B 6/3508; G02B 6/3566
See application file for complete search history.

(56) References Cited

U.S. PATENT DOCUMENTS

| 5,932,887 A | 8/1999 | Guzik |
| 6,519,382 B1 | 2/2003 | Jurbergs et al. |

(Continued)

FOREIGN PATENT DOCUMENTS

EP    1186932 A2    3/2002

OTHER PUBLICATIONS

Seok et al., "Large-scale broadband digital silicon photonic switches with vertical adiabatic couplers", Optica, vol. 3, No. 1, pp. 64-70, Jan. 2016.

(Continued)

*Primary Examiner* — Omar R Rojas
(74) *Attorney, Agent, or Firm* — Kligler & Associates Patent Attorneys Ltd.

(57) ABSTRACT

An optical switching device (20) includes a substrate (39) and first and second optical waveguides (23, 25) having respective first and second tapered ends (62, 64), which are fixed on the substrate in mutual proximity one to another. A pair of electrodes (36, 38) is disposed on the substrate with a gap therebetween. A cantilever beam (32) is disposed on the substrate within the gap and configured to deflect transversely between first and second positions within the gap in response to a potential applied between the electrodes. A third optical waveguide (21) is mounted on the cantilever beam and has a third tapered end (60) disposed between the first and second tapered ends of the first and second wave- (Continued)

guides, so that the third tapered end is in proximity with the first tapered end when the cantilever beam is in the first position and is in proximity with the second tapered end when the cantilever beam is in the second position.

10 Claims, 2 Drawing Sheets

(56) References Cited

U.S. PATENT DOCUMENTS

| | | | | |
|---|---|---|---|---|
| 6,810,166 | B2* | 10/2004 | Baumann | G02B 6/3504 385/128 |
| 6,982,185 | B2 | 1/2006 | Kubena et al. | |
| 7,885,499 | B2* | 2/2011 | Blauvelt | G02B 6/2804 385/50 |
| 10,466,422 | B1 | 11/2019 | Aharon et al. | |
| 2002/0001446 | A1* | 1/2002 | Arakawa | G02B 6/13 385/129 |
| 2002/0153583 | A1 | 10/2002 | Frazier et al. | |
| 2002/0153584 | A1 | 10/2002 | Frazier et al. | |
| 2003/0067047 | A1 | 4/2003 | Sandoe et al. | |
| 2003/0113067 | A1 | 6/2003 | Koh et al. | |
| 2003/0128918 | A1 | 7/2003 | Zhang et al. | |
| 2004/0037488 | A1 | 2/2004 | Guidotti et al. | |
| 2004/0184720 | A1 | 9/2004 | Kubby | |
| 2005/0147344 | A1 | 7/2005 | Assefa et al. | |
| 2010/0183302 | A1 | 7/2010 | Lamvik et al. | |
| 2016/0327751 | A1 | 11/2016 | Wu et al. | |
| 2016/0377805 | A1 | 12/2016 | Ellis-Monaghan et al. | |

OTHER PUBLICATIONS

Morphic, "Approach; Consortium", pp. 1-5, year 2018 (downloaded from https://h2020-morphic.intec.ugent.be/).

Quack, N., Note re MORPHIC presentation on Diamond Photocs and Silicon Photonic MEMS, p. 1, May 13, 2018 (downloaded from https://twitter.com/QLAB_EPFL/status/995692952344322049).

International Application #PCT/GR2019/000004 Search Report dated Oct. 9, 2019.

Xin Tu et al., "State of the Art and Perspectives on Silicon Photonic Switches," Micromachines, vol. 10, No. 51, pp. 1-19, Jan. 13, 2019.

Chollet, "Devices Based on Co-Integrated MEMS Actuators and Optical Waveguide: A Review", Micromachines, vol. 7, No. 18, pp. 1-34, Jan. 25, 2016.

* cited by examiner

ADIABATIC OPTICAL SWITCH USING A WAVEGUIDE ON A MEMS CANTILEVER

FIELD OF THE INVENTION

The present invention relates generally to photonic devices, and particularly to optical switches based on mechanical motion, including specifically micro-electro-mechanical systems (MEMS).

BACKGROUND

In optical communication systems, optical switches are used to direct optical signals along desired transmission paths or to route these optical signals around a fault in the transmission path. The transmission path is typically through an optical fiber or other waveguide. There are many physical mechanisms for performing optical switching from one or more input waveguides to one or more output waveguides. Some key performance parameters of optical switches include their transmission losses to the desired output port, crosstalk to undesired ports, switching time, physical size, scalability and cost.

Some optical switches use adiabatic coupling to transfer optical signals between waveguides in mutual proximity. Because the coupling is adiabatic, the radiation propagates from one waveguide to another, without substantial reflection, scattering or energy transfer into undesired-modes, thus exhibiting low optical loss. A gradual change in the width of the coupled waveguides over a sufficiently long taper length can achieve the desired adiabatic behavior.

For example, Seok et al. describe optical switches using adiabatic couplers in "Large-scale broadband digital silicon photonic switches with vertical adiabatic couplers," published in *Optica* 3:1, pages 64-70 (2016). The authors specifically report a matrix switch with 4096 microelectro-mechanical-systems-actuated vertical adiabatic couplers.

As another example, U.S. Patent Application Publication 2016/0327751 describes an optical switching system comprising a switching cell having first and second fixed-position bus waveguides and a moveable shunt waveguide. When the switching cell is in its unswitched state, the shunt waveguide is not optically coupled with either bus waveguide and a light signal can pass from the input to a first output while remaining in the first bus waveguide. When the switching cell is in its switched state, the shunt waveguide is optically coupled with both bus waveguides such that the light signal is coupled out of the first bus waveguide and into the second bus waveguide via the shunt waveguide. In some embodiments a switching cell includes adiabatic directional couplers for optically coupling a shunt waveguide and bus waveguides, wherein the shunt waveguide is formed in a silicon-based layer disposed above the bus waveguides.

SUMMARY

Embodiments of the present invention that are described hereinbelow provide an improved optical switch.

There is therefore provided, in accordance with an embodiment of the invention, an optical switching device, including a substrate and first and second optical waveguides having respective first and second tapered ends, which are fixed on the substrate in mutual proximity one to another. A pair of electrodes is disposed on the substrate with a gap therebetween. A cantilever beam is disposed on the substrate within the gap and configured to deflect transversely between first and second positions within the gap in response to a potential applied between the electrodes. A third optical waveguide is mounted on the cantilever beam and has a third tapered end disposed between the first and second tapered ends of the first and second waveguides, so that the third tapered end is in proximity with the first tapered end when the cantilever beam is in the first position and is in proximity with the second tapered end when the cantilever beam is in the second position.

In some embodiments, the first, second and third optical waveguides are configured so that when the third tapered end comes into proximity with one of the first and second tapered ends, optical radiation is transferred adiabatically between the third tapered end and the one of the first and second tapered ends. Typically, the device includes a controller, which is coupled to apply the potential to the electrodes with voltages that vary so as to switch the cantilever beam between the first and second positions, thereby switching a path of the optical radiation between the first and second optical waveguides.

Additionally or alternatively, the cantilever beam is conductive, and the device includes an insulating layer disposed over the cantilever beam, and the third optical waveguide is disposed over the insulating layer. In one embodiment, the cantilever beam and the third optical waveguide include silicon, and the insulating layer includes silicon dioxide.

Further additionally or alternatively, the substrate includes a silicon-on-insulator (SOI) substrate, including a silicon layer, an isolation layer, including a dielectric material formed on the silicon layer, and an actuation layer formed on the isolation layer, wherein the actuation layer includes silicon, which is doped for conducting electricity, and wherein the cantilever beam is formed in the actuation layer. In a disclosed embodiment, the dielectric material includes silicon dioxide.

There is also provided, in accordance with an embodiment of the invention, a method for optical switching, which includes fixing first and second optical waveguides, having respective first and second tapered ends, on a substrate in mutual proximity one to another. A pair of electrodes is formed on the substrate with a gap therebetween. A cantilever beam is etched from the substrate within the gap so that the beam is able to deflect transversely between first and second positions within the gap in response to a potential applied between the electrodes. A third optical waveguide is mounted on the cantilever beam, having a third tapered end disposed between the first and second tapered ends of the first and second waveguides, so that the third tapered end comes into proximity with the first tapered end when the cantilever beam is in the first position and comes into proximity with the second tapered end when the cantilever beam is in the second position.

The present invention will be more fully understood from the following detailed description of the embodiments thereof, taken together with the drawings in which:

DETAILED DESCRIPTION OF EMBODIMENTS

Figure 1:
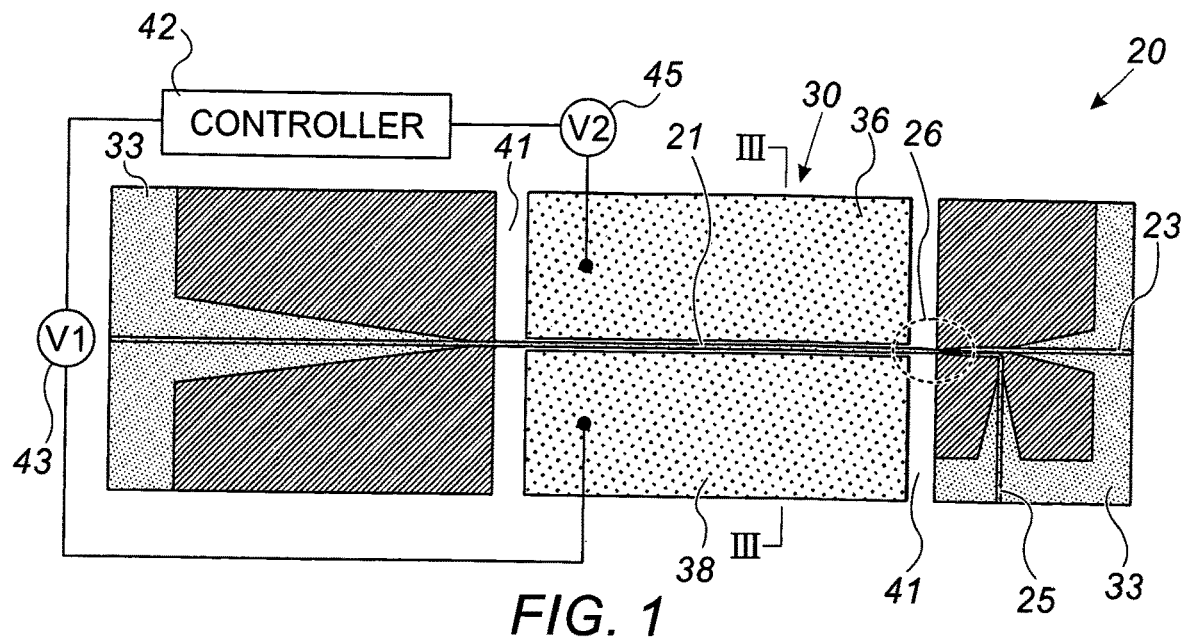
FIG. 1 is a schematic top view of a basic 1×2 optical switching unit, in accordance with an embodiment of the invention.

Despite the widespread use of fiberoptic communications, there is an unmet need for optical switches that are fast, small, reliable and inexpensive.

U.S. patent application Ser. No. 15/980,768, filed May 16, 2018, whose disclosure is incorporated herein by reference, describes an optical switch utilizing frustrated total internal reflection (FTIR) to couple optical signals between waveguides, as well as switching devices and switch networks based on such an optical switch. By shifting a first waveguide by a small distance, typically a few hundreds of nanometers, between first and second positions, the optical signal propagating in the first waveguide is either coupled to a second waveguide by FTIR, or to a third waveguide by total internal reflection (TIR). The first waveguide is shifted by an actuator, comprising a cantilever beam and electrodes based on MEMS technology.

Embodiments of the present invention that are described herein likewise use an actuator based on a cantilever beam, but use adiabatic coupling through tapered waveguides to transfer the optical signals. In the disclosed embodiments, the actuation and energy transfer are all in plane, requiring only minimal energy input and movement of the waveguides, without physical contact between the waveguides. Like the FTIR-based switch mentioned above, the present embodiments can be mass-produced simply, using MEMS technology, at low cost. The adiabatic coupling scheme offers advantages of high coupling efficiency, rapid switching, high reliability and long operating life.

In the disclosed embodiments, an optical switching device comprises a substrate, with two optical waveguides, having tapered ends, fixed on the substrate in mutual proximity one to another. Optical signals are selectively switched in or out of these two fixed waveguides by a movable optical waveguide, also having a tapered end, which is disposed between the tapered ends of the two fixed waveguides and moves between positions in which it comes into close proximity with one or the other of the tapered ends. Thus, optical signals are transferred adiabatically through the tapered ends between the movable waveguide and one or the other of the fixed waveguides.

The movement of the waveguide is accomplished by a MEMS actuator, using a pair of electrodes formed on the substrate and a cantilever beam formed on the substrate within a gap between the electrodes. The movable optical waveguide is mounted on this cantilever beam. In response to an electric potential applied between the electrodes, the cantilever beam deflects transversely (i.e., in a direction perpendicular to the propagation axis of the optical signal along the beam) between different positions within the gap. This movement of the beam causes the tapered end of the movable waveguide to come into proximity with the tapered end of one or the other of the fixed waveguides, as explained above. A controller applies a varying voltage level to the electrodes so as to attract the cantilever beam between the different positions, and thus switch the path of the optical radiation between the optical waveguides.

The optical switching device described herein can advantageously be produced on a silicon substrate, with both the actuator (comprising the electrodes and cantilever beam) and the waveguide made from silicon. In this case, the cantilever beam and electrodes are doped for conductivity, while the waveguides are electrically and optically isolated from the actuator and substrate by an insulating dielectric layer, such as silicon dioxide. Alternatively, the principles of the present invention may be implemented, mutatis mutandis, using media of other sorts.

Figure 2:
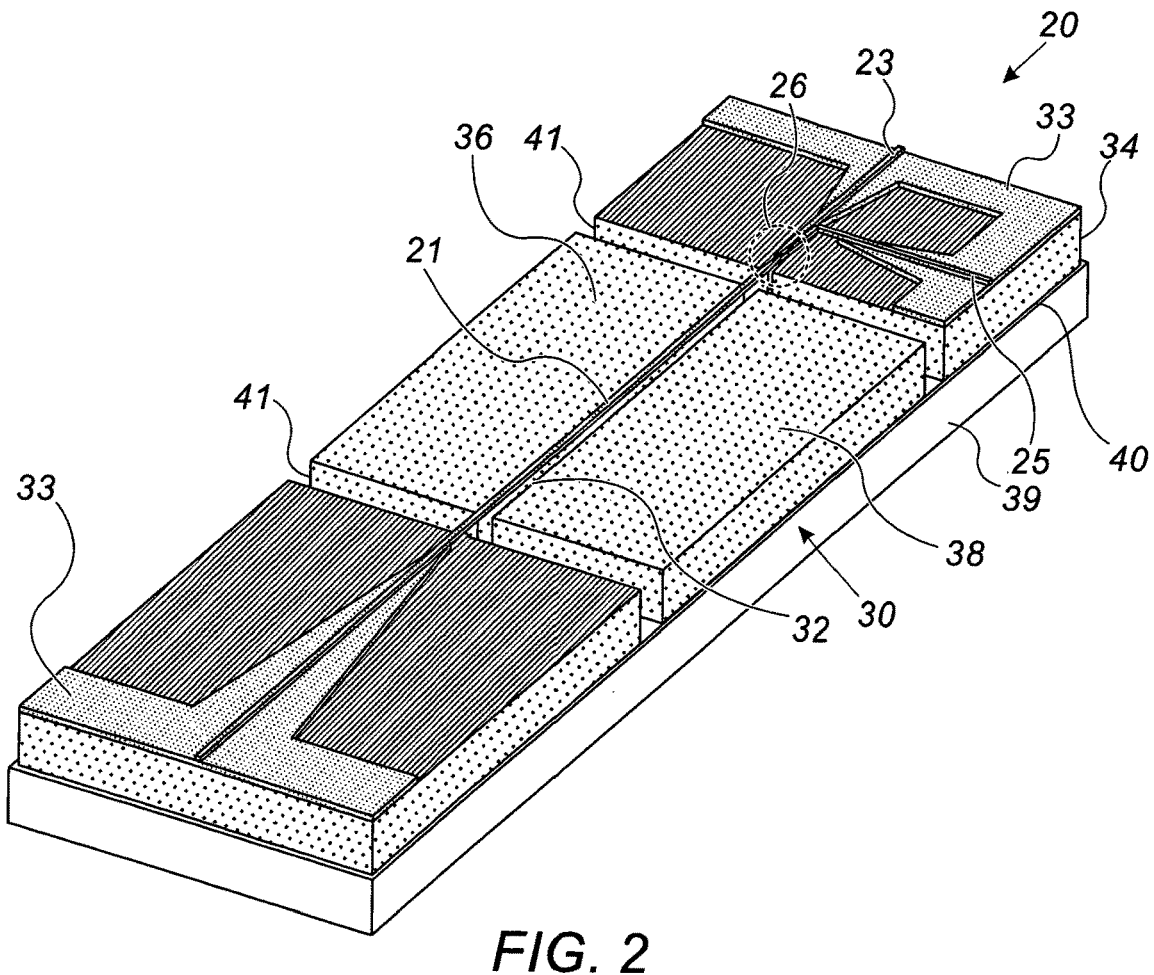
FIG. 2 is a schematic perspective view of the optical switch of FIG. 1, in accordance with an embodiment of the invention.

Reference is now made to FIGS. 1 and 2, which schematically illustrate an optical switch 20, in accordance with an embodiment of the invention. FIG. 1 is a top view of the switch, while FIG. 2 is a perspective view. Switch 20 in this example is a basic 1×2 switching element. Four elements of this sort can be used to create a 2×2 switch, which in turn can serve as a building block for switch networks of larger radix. Switches in accordance with embodiments of the present invention can be substituted, for example, for the FTIR-based switches used in the switch networks described in the above-mentioned U.S. patent application Ser. No. 15/980, 768.

Optical switch 20 comprises a movable waveguide 21, and first and second fixed waveguides 23 and 25. Waveguides 21, 23, and 25 confine light in their core regions, and may in general be either single-mode or multi-mode waveguides or combinations thereof. In the present embodiment, the waveguides are made of silicon in a strip waveguide design, positioned on top of an silicon dioxide layer (shown in FIG. 3). The waveguides may have a height of 1.5 Inn and a width of 1.0 μm, for example. In alternative embodiments, other dimensions and core and cladding materials may be used. Waveguides 21, 23, and 25 are etched into a silicon waveguide layer 33, which is transparent over a typical wavelength band of 1200-1700 nm used in, for example, optical communications. Waveguide 21 meets waveguides 23 and 25 in an adiabatic coupler 26, which is shown in detail in FIG. 4.

Optical switch 20 is implemented in the present embodiment in a stack of three silicon layers in a silicon-on-insulator (SOI) substrate configuration:

1) A substrate 39 (also called a handle) is a thick layer (typically 400-1000 μm thick), whose primary purpose is to carry the top layers above it and provide mechanical rigidity.

2) An actuation layer 34 is of intermediate thickness (typically 3-100 μm) and provides mechanical actuation and electrical address ability.

3) A waveguide layer 33 is relatively thin (typically 0.1-10 μm) and provides optical waveguiding.

Actuator 30 comprises a conductive silicon cantilever beam 32, which is etched into actuation layer 34 using methods known in MEMS technology. Waveguide 21 is mounted on cantilever beam 32. Electrodes 36 and 38 are formed in actuation layer 34 on opposing sides of cantilever beam 32, defining a gap in which the cantilever beam is able to move transversely, in the plane of layer 34. To enable this movement, cantilever beam 32 is released from the other elements in actuation layer 34 and from substrate 39 (except at the end opposite coupler 26). Electrodes 36 and 38 are insulated from substrate 39 by an isolation layer 40 and from other parts of actuation layer 34 by etched trenches 41. Isolation layer 40 typically comprises silicon dioxide with a thickness of 0.5 μm, for example, but other suitable insulating materials and dimensions may alternatively be used.

A controller 42 is coupled to a first voltage source 43 and a second voltage source 45, which in turn are coupled to electrodes 36 and 38. Cantilever beam 32 is coupled to a ground potential via the part of actuating layer 34 that is not connected to electrodes 36 and 38. By applying suitable potentials between cantilever beam 32 and electrodes 36 and 38, controller 42 causes cantilever beam 32 to bend towards the activated electrode within the gap region, and thus moves the end of waveguide 21 into close proximity with waveguide 23 or 25. For example, applying a voltage (positive or negative) to electrode 36 while simultaneously grounding (bringing to zero potential) both cantilever beam 32 and opposite electrode 38, will cause the cantilever beam to bend into a first position near electrode 36 due to the Coulomb attractive force between the potential differences of the electrode and the beam. Applying the voltage on electrode 36 will cause beam 32 to bend in the opposite direction, into a second position near electrode 38. A typical voltage range for bending cantilever beam 32 to either the first or the second position is 5-60 V (depending strongly on the physical and geometrical parameters of actuator 30).

In an alternative embodiment, cantilever beam 32 may be coupled through a separate voltage source to controller 42, instead of to ground potential. In this case, the potential of the cantilever beam, as well as the potentials of electrodes 36 and 38, may be independently controlled by the controller.

Figure 3:
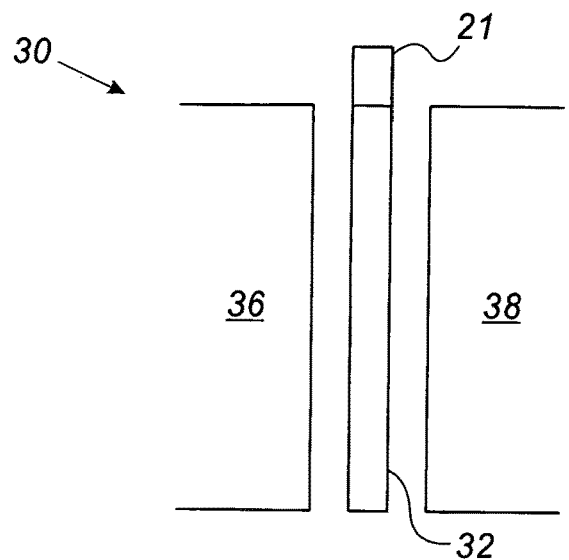
FIG. 3 is a schematic sectional view showing a detail of the optical switch of FIG. 1, in accordance with an embodiment of the invention.

FIG. 3 is a schematic sectional view showing a detail of optical switch 20, taken along a line III-III FIG. 1, in accordance with an embodiment of the invention. Beam 32 is shown in the center of the gap between electrodes 36 and 38, with waveguide 21 disposed above beam 32. Beam 32 in this example is a few μm wide and 10-20 μm high, with a gap on either side of few μm between the beam and the electrodes. These dimensions, however, are presented solely by way of example, and larger or smaller dimensions may alternatively be used.

Figure 4:
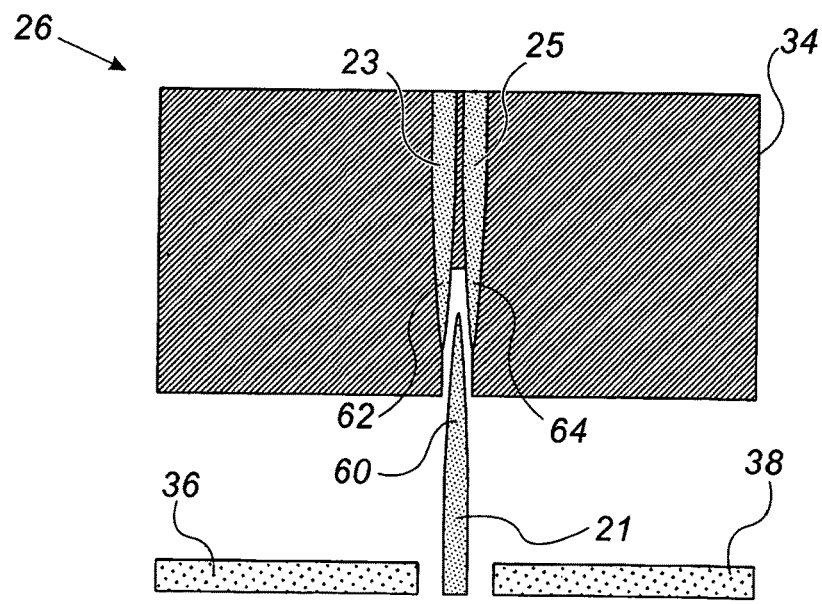
FIG. 4 is a schematic top view of an adiabatic coupler used in an optical switch, shown in a neutral, position, in accordance with an embodiment of the invention.

FIG. 4 is a schematic top view of adiabatic coupler 26, shown here in a neutral position, in accordance with an embodiment of the invention. Waveguides 21, 23 and 25 have respective tapered ends 60, 62 and 64. The taper gradient of end 60 of waveguide 21 is in the opposite direction to those of ends 62 and 64 of waveguides 23 and 25, so that the cross-sectional areas of ends 62 and 64 decrease as that of end 60 increases (and vice versa). Consequently, when transverse movement of beam 32 causes end 60 to come into proximity with one of ends 62 and 64, optical radiation is transferred adiabatically between the ends that are in mutual proximity.

Figure 5A:
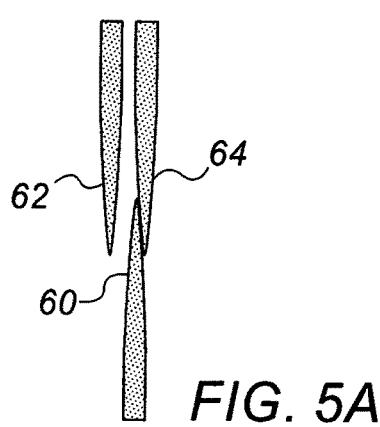
FIGS. 5A and 5B are schematic top and perspective views of the adiabatic coupler of FIG. 4, shown in a switching position, in accordance with an embodiment of the invention.
Figure 5B:
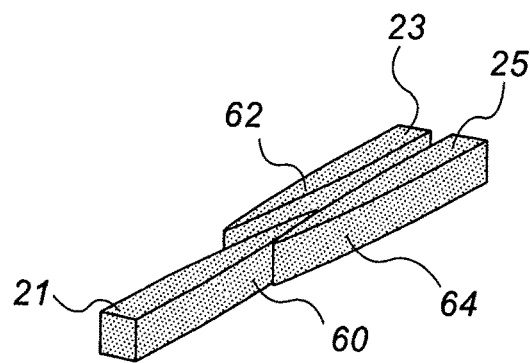

FIGS. 5A and 5B are schematic top and perspective views of adiabatic coupler 26, shown in one switching position, in accordance with an embodiment of the invention. In the pictured example, tapered end 60 of waveguide 21 is in close proximity to tapered end 64 of waveguide 25. With the tapered ends in this position, optical signals are transferred between waveguides 21 and 25 with very high efficiency, low crosstalk, and low back-reflection and scattering loss, as the optical mode in one of the waveguides couples directly into the other waveguide without change. Coupler 26 can be designed to support both horizontal and vertical polarizations. Tapered ends 60, 62 and 64 support a single mode in the narrow (horizontal) dimension but may submit multiple modes in the untapered (vertical) dimension.

Although the figures above show a particular geometrical and mechanical configuration of switch 20, the principles of adiabatic coupling and switching that are described above may alternatively be implemented in other suitable configurations, as will be apparent to those skilled in the art after reading the above description. All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical switching device, comprising:
   a substrate;
   first and second optical waveguides having respective first and second tapered ends, which are fixed on the substrate in mutual proximity one to another;
   a pair of electrodes disposed on the substrate with a gap therebetween;
   a cantilever beam disposed on the substrate within the gap and configured to deflect transversely between first and second positions within the gap in response to a potential applied between the electrodes;
   a third optical waveguide mounted on the cantilever beam and having a third tapered end disposed between the first and second tapered ends of the first and second waveguides, so that the third tapered end is in proximity with the first tapered end so that optical radiation is transferred adiabatically between the third tapered end and the first tapered end when the cantilever beam is in the first position and is in proximity with the second tapered end so that optical radiation is transferred adiabatically between the third tapered end and the second tapered end when the cantilever beam is in the second position,
   wherein the third waveguide does not make physical contact with either of the first and second waveguides; and
   a controller, which is coupled to apply the potential to the electrodes with voltages that vary so as to switch the cantilever beam between the first and second positions, thereby switching a path of the optical radiation between the first and second optical waveguides.

2. The device according to claim 1, wherein the cantilever beam is conductive, and the device comprises an insulating layer disposed over the cantilever beam, and the third optical waveguide is disposed over the insulating layer.

3. The device according to claim 2, wherein the cantilever beam and the third optical waveguide comprise silicon, and the insulating layer comprises silicon dioxide.

4. The device according to claim 1, wherein the substrate comprises a silicon-on-insulator (SOI) substrate, comprising:
   a silicon layer;
   an isolation layer, comprising a dielectric material formed on the silicon layer; and
   an actuation layer formed on the isolation layer, wherein the actuation layer comprises silicon, which is doped for conducting electricity,
   wherein the cantilever beam is formed in the actuation layer.

5. The device according to claim 4, wherein the dielectric material comprises silicon dioxide.

6. A method for optical switching, comprising:
   fixing first and second optical waveguides, having respective first and second tapered ends, on a substrate in mutual proximity one to another;
   forming a pair of electrodes on the substrate with a gap therebetween;

etching a cantilever beam from the substrate within the gap so that the beam is able to deflect transversely between first and second positions within the gap in response to a potential applied between the electrodes;

mounting on the cantilever beam a third optical waveguide having a third tapered end disposed between the first and second tapered ends of the first and second waveguides, so that the third tapered end comes into proximity with the first tapered end so that optical radiation is transferred adiabatically between the third tapered end and the first tapered end when the cantilever beam is in the first position and comes into proximity with the second tapered end so that optical radiation is transferred adiabatically between the third tapered end and the second tapered end when the cantilever beam is in the second position; and applying the potential to the electrodes with voltages that vary so as to switch the cantilever beam between the first and second positions, thereby switching a path of the optical radiation between the first and second optical waveguides, wherein the third waveguide does not make physical contact with either of the first and second waveguides.

7. The method according to claim 6, wherein the cantilever beam is conductive, and mounting the third optical waveguide comprises forming an insulating layer over the cantilever beam, and forming the third optical waveguide over the insulating layer.

8. The method according to claim 7, wherein the cantilever beam and the third optical waveguide comprise silicon, and the insulating layer comprises silicon dioxide.

9. The method according to claim 6, wherein the substrate comprises a silicon-on-insulator (SOI) substrate, comprising:
- a silicon layer;
- an isolation layer, comprising a dielectric material formed on the silicon layer; and
- an actuation layer formed on the isolation layer, wherein the actuation layer comprises silicon, which is doped for conducting electricity,
- wherein etching the cantilever beam comprises forming the cantilever beam in the actuation layer.

10. The method according to claim 9, wherein the dielectric material comprises silicon dioxide.

\* \* \* \* \*